United States Patent
Bates (10) Patent No.: US 7,447,684 B2
(45) Date of Patent: Nov. 4, 2008

(54) DETERMINING SEARCHABLE CRITERIA OF NETWORK RESOURCES BASED ON A COMMONALITY OF CONTENT

(75) Inventor: Cary L. Bates, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 151 days.

(21) Appl. No.: 11/279,610

(22) Filed: Apr. 13, 2006

(65) Prior Publication Data

US 2007/0244855 A1 Oct. 18, 2007

(51) Int. Cl.
G06F 7/00 (2006.01)
G06F 17/30 (2006.01)

(52) U.S. Cl. .................... 707/3; 707/101; 707/6

(58) Field of Classification Search .............. 707/3, 707/101, 6
See application file for complete search history.

(56) References Cited

U.S. PATENT DOCUMENTS

| 5,864,863 | A * | 1/1999 | Burrows | 707/103 |
| 7,130,848 | B2 * | 10/2006 | Oosta | 707/5 |
| 2002/0087515 | A1 * | 7/2002 | Swannack et al. | 707/2 |
| 2005/0171932 | A1 * | 8/2005 | Nandhra | 707/3 |

* cited by examiner

Primary Examiner—Hosain T Alam
Assistant Examiner—Van H Ngo
(74) Attorney, Agent, or Firm—Patterson & Assocaites (57) ABSTRACT

A method, article of manufacture, apparatus for determining keywords to be used by a search engine. In one embodiment, a list of hyperlinks contained in an electronic document is identified by a searching program. The searching program then accesses the resource content (e.g., HTML) from each resource pointed to by the hyperlinks. The resource content of each resource is examined to determine whether a commonality exists in a manner directed to identifying keywords for each resource. These keywords may then be used by a search engine to return more accurate results to user queries.

21 Claims, 5 Drawing Sheets

```
<html>
<h1> Outdoor Activity Page </h1>
<br><br>
<h3> Sites for Fishing </h3>
<ol>                                                                    ← 220
<h4>
    <li><a href= "http://www.paulsangling.com">Paul's Angling Site</a></li>
    <li><a href= "http://www.stevesfishing.com">Steve's Fly Fishing Site</a></li>   } 222
    <li><a href= "http://www.briansoffshorefishing.com">Brian's Offshore Fishing Site</a></li>
</h4>
</ol>                                                                   ← 225
<br>
<h3> Sites for Motorcycle Riding </h3>
<ul>                                                                    ← 230
<h4>
    <li><a href= "http://www.harley-davidson.com">Harley Davidson Motorcycles</a></li>   } 232
    <li><a href= "http://www.polarisindustries.com">Victory Motorcycles</a></li>
</h4>
</ul>                                                                   ← 235
<br>
</html>
```

DETERMINING SEARCHABLE CRITERIA OF NETWORK RESOURCES BASED ON A COMMONALITY OF CONTENT

BACKGROUND OF THE INVENTION

1. Field of the Invention

Embodiments of the invention generally relate to the field of data-processing. More specifically, the invention relates to data processing to determine searchable content of network resources.

2. Description of the Related Art

Computer networks were developed to allow multiple computers to communicate with each other. In general, a network can include a combination of hardware and software that cooperate to facilitate the desired communications. One example of a computer network is the Internet, a sophisticated worldwide network of computer system resources.

The growing size of networks, particularly the Internet, makes it difficult to locate relevant information in an expedient fashion. As a result, search engines were developed to locate information on the network based on a query input by a user. Search engines comprise a search tool referred to as a spider, a crawler, or a robot, which builds indexes containing traversed network resources (e.g., addresses, Uniform Resource Locators (URLs), websites, etc.) according to well-known protocols and algorithms.

A user-input query in the form of search words, phrases, keywords, network addresses, etc., prompts the search engine to sift through the plurality of network resources (typically on the order of millions) in the index to find matches to the user query. Search engines typically reside on a server accessible via the internet to multiple users. Search queries are sent from the users to the search engine via a network connection. The search engine then parses the query and executes a search algorithm to identify any network resources containing information matching the query. Having identified results matching the user's query, the results are then returned and displayed to the user for review and selection.

One problem with conventional search engines is the amount of URLs that are returned to the user that are not relevant to the user query. To understand how this happens one must understand how search engines match a user query with a URL. One method of matching queries to URLs is to associate a keyword or keywords with the indexed URLs. If a term in the user query matches a keyword associated with a URL, then the URL is returned to the user.

One method to determine a keyword to index with a particular URL or website may be to analyze the frequency of occurrence of a word on the website. If a word appears a number of times on a website, such that the frequency of the word's appearance surpasses a predefined threshold, then the word may be deemed a keyword for the URL. Another method of determining a keyword for a particular website is to examine links from other sites to the particular website. If a particular word is used within a link to the URL of the particular website, then that word may be deemed a keyword for the URL of the particular website.

The problem with these methodologies is that web site designers have found ways mislead search engines, and consequently place their websites high in the result list of a user query, even though the true content of their websites may have no relation to the user query. This practice is commonly referred to as "spamming." One example or spamming is keyword spamming. For instance, a web designer may place a high number of words commonly chosen for user queries, but not representative of the content of the website, within the text of the website (or within HTML structures known as meta tags). This is done with the intention of the search engine crawler associating those common query words with the website as keywords. Because the search engine crawler has now associated the query words with the website, the website is more likely to be returned in response to a query using the keywords. Due to this and other spamming techniques, search engines return less accurate results in response to user queries.

Therefore, a need exists for a method and apparatus to determine searchable criteria of network resources based on a commonality of content.

SUMMARY OF THE INVENTION

The present invention generally provides methods, articles of manufacture and an apparatus to determine searchable criteria of network resources based on a commonality of content.

One embodiment provides a method for determining keywords representative of the content of an electronic document located at a source network address. The method generally comprises: analyzing a document definition of the electronic document located at the source network address to identify one or more lists of hyperlinks to other electronic documents located at respective target network addresses; for at least two hyperlinks in at least one identified list of hyperlinks, accessing the respective electronic documents pointed to by the at least two respective hyperlinks; for each respective electronic document accessed, analyzing the respective document definition of the respective electronic document to determine a set of words representative of the respective electronic document; comparing each determined set of words to an determine whether a commonality exists between the set of words based on some predefined criteria; and if the commonality exists, making at least a portion of the set of words the keywords for the one or more of respective electronic documents defined by the respective document definitions.

Another embodiment provides a method for determining keywords. The method generally comprises: analyzing a document definition of an electronic document located at a website to identify one or more lists of hyperlinks to other electronic documents; accessing respective document definitions for each electronic document pointed to by the respective hyperlinks in the identified one or more lists; for each of the respective document definitions, analyzing the respective document definition to determine a set of words representative of respective document definition; comparing each determined set of words to one another to determine whether there is a common set of words; and if there is a common set of words, making the common set of words the keywords for each site containing the common set of words, the keywords being defined as words accessed by search engines to determine a relevancy of the respective site for a given keyword search.

Another embodiment provides a computer readable medium containing a program. The program when executed, performs an operation for determining keywords representative of the content of an electronic document located at a source network address, the operation generally comprising: analyzing a document definition of the electronic document located at the source network address to identify one or more lists of hyperlinks to other electronic documents located at respective target network addresses; for at least two hyperlinks in at least one identified list of hyperlinks, accessing the respective electronic documents pointed to by the at least two respective hyperlinks; for each respective electronic document accessed, analyzing the respective document definition of the respective electronic document to determine a set of words representative of the respective electronic document; comparing each determined set of words to an determine whether a commonality exists between the set of words based on some predefined criteria; and if the commonality exists, making at least a portion of the set of words the keywords for one or more of respective electronic documents defined by the respective document definitions.

Another embodiment provides a computer system comprising of a processor. The processor is generally configured to: analyze a document definition of an electronic document located at a source network address to identify one or more lists of hyperlinks to other electronic documents located at respective target network addresses; for at least two hyperlinks in at least one identified list of hyperlinks, access the respective electronic documents pointed to by the at least two respective hyperlinks; for each respective electronic document accessed, analyze the respective document definition of the respective electronic document to determine a set of words representative of the respective electronic document; compare each determined set of words to an determine whether a commonality exists between the set of words based on some predefined criteria; and if the commonality exists, make at least a portion of the set of words the keywords for one or more of respective electronic documents defined by the respective document definitions.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the present invention provide systems, articles of manufacture, and methods to determine the primary content of a website for more accurate search engine results. In one embodiment, a search engine crawler or robot, may access a network address. The search engine crawler may access the resource content (e.g., HTML) from the network address. During the examination of the content, the search engine crawler may discover a listing of hyperlinks within the content. The search engine crawler may then either ignore the listing of hyperlinks or access and examine the content of the resources pointed to by each of the hyperlinks within the list. If the search engine crawler accesses and examines the content for each of the linked resources, the search engine crawler takes steps to determine a commonality of content between the resources. For example, the crawler may discover that all of the resources pointed to by the respective hyperlinks within the list use a common word or a common set of words. In this case, the search engine crawler may then store or associate those common words with the hyperlinks as content representative keywords. These keywords may then be used by a search engine to return results to user queries.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system such as, for example, the computing environment 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature. In this regard, references to particular definitional languages, such as HTML and XML, are merely illustrative. Is broadly contemplated that the invention is applicable regardless of the particular schema or language used to defined network resource content.

Figure 1:
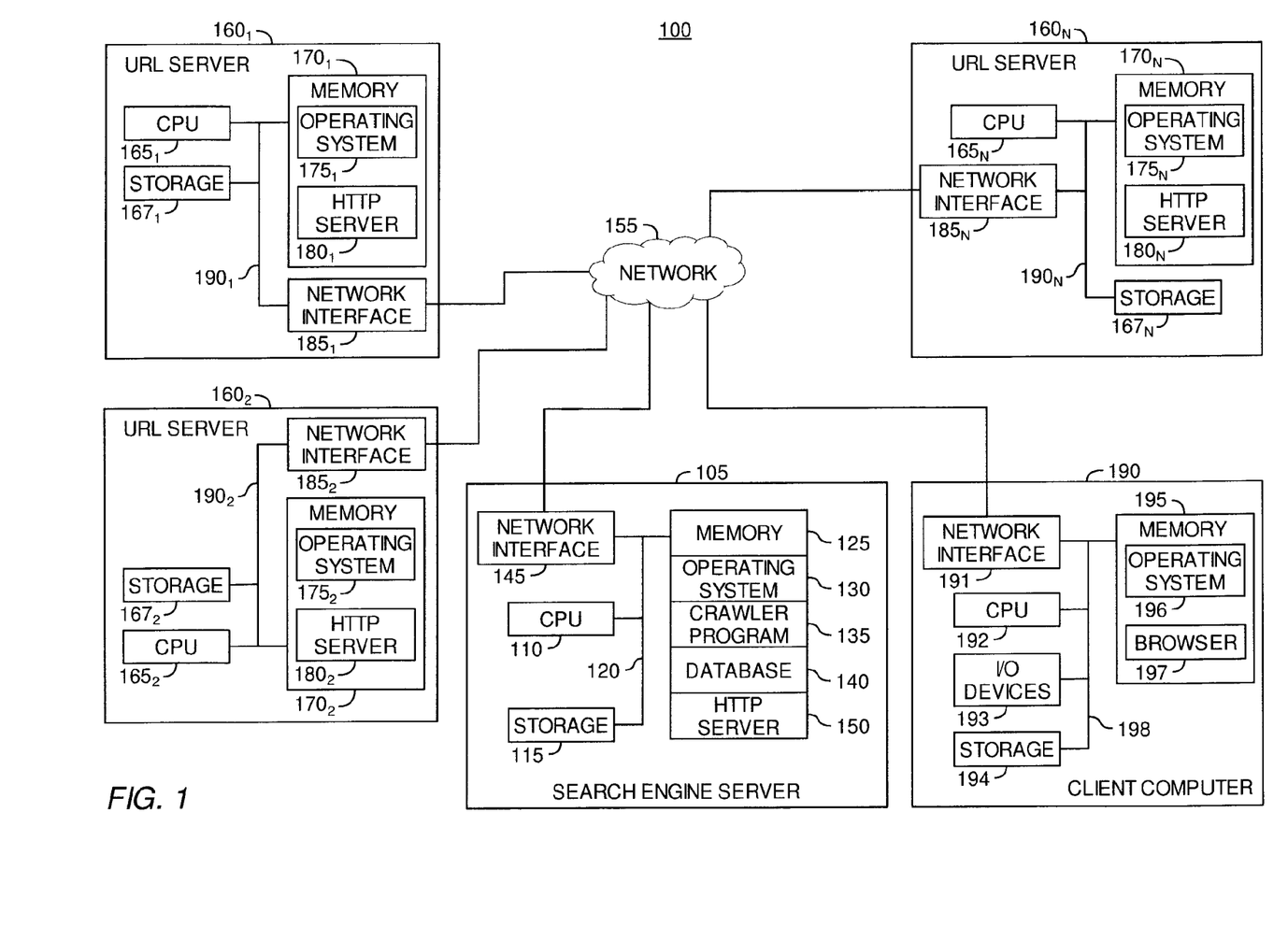
FIG. 1 is a block diagram illustrating an exemplary computing environment in which embodiments of the present invention may be utilized.

FIG. 1 is a block diagram illustrating an exemplary computing environment 100 in which embodiments of the present invention may be utilized. In general, the computing environment 100 includes a client (e.g. user's) computer 190, a search engine server 105, and at least one URL server 160 (three such servers $160_{1-n}$ are shown). The client computer 190 and the server computers may be the components of the same computer system, or may be connected via a network 155, such as the Internet.

The client computer 190 includes a Central Processing Unit (CPU) 192 connected via a bus 198 to a memory 195, storage 194, input device and output devices 193. The input devices 193 can be any device to give input to the client computer 195. For example, a keyboard, keypad, light-pen, touch-screen, track-ball, or speech recognition unit could be used. The input device may also be an external device or computer used to determine the physical location of the user's computer such as a global positioning system (GPS). The output devices 193 may consist of any conventional display screen or any other output devices such as speakers. Storage 198 is preferably a direct access storage device (DASD), although it is shown as a single unit, it could be a combination of fixed and/or removable storage devices, such as fixed disc drives, floppy disc drives, tape drives, removable memory cards, or optical storage. Memory 195 and storage 194 could be part of one virtual address space spanning multiple primary and secondary storage devices. The client computer 190 may also contain a network interface device 185. This device may be any suitable device to connect to a network 155 (e.g., analog modem, wired network card, wireless network device).

Memory 195 is preferably random access memory sufficiently large to hold the necessary programming and data structures located on the client computer 190. While memory 195 is shown as a single entity, it should be understood that memory 195 may in fact comprise a plurality of modules, and that memory 195 may exist at multiple levels, from high speed registers and caches to lower speed but larger DRAM chips. Memory 195 contains an operating system 196 for managing hardware and software executing on the client computer 190. Memory 195 may also contain a browser program 197 that, when executed on CPU 192, provides support for navigating between the various servers and locating network addresses at one or more of the servers.

Each URL server computer 160 generally comprises a CPU 165, a memory 170, a network interface device 185, and a storage device 167, coupled to one another by a bus 190. Memory 170 is a random access memory sufficiently large to hold the necessary programming and data structures that are located on the server computer 160. As shown, memory 170 contains an operating system 175 to manage server hardware and software executing on the server computer 124. Memory 170 may also include a hypertext transfer protocol (http) server process 180 adapted to service requests from the client computer 190. For example, process 180 may respond to requests to access electronic resource(s) (e.g., HTML documents, network information, and the like) residing on the server 160. The http server process 180 is merely illustrative and other embodiments adapted to support any known and unknown protocols are contemplated. The programming and data structures may be accessed and executed by the CPU 165 as needed during operation. The URL server computer 160 may also contain a network interface device 185. This device may be any suitable device to connect to a network 155 (e.g., analog modem, wired network card, wireless network device).

The search engine server computer 105 generally comprises a CPU 110, a memory 125, a network interface device 145, and a storage device 115, coupled to one another by a bus 120. Memory 125 is a random access memory sufficiently large to hold the necessary programming and data structures that are located on the server computer 124.

As shown, the memory 125 includes an operating system 130 and a hypertext transfer protocol (http) server process 150 adapted to service requests from the client computer 122. For example, process 150 may respond to requests to access electronic resource(s) 150 (e.g., search engine forms for entering search queries) residing on the server 124. The http server process 150 is merely illustrative and other embodiments adapted to support any known and unknown protocols are contemplated. Also illustrated, memory 125 contains a crawler program 135 and a database 140. The database 140 may be accessed by the search engine in response to user queries. The search engine may return to the user a list of URLs relevant to the search criteria entered by the user. The criteria entered by the user is most often submitted in the form of keywords.

The crawler program 135 may be configured to access URLs on the network 155 at predefined times. The crawler program 135 may be further configured to retrieve information to update the database 140. The crawler program 135 may store URLs, information downloaded from the URLs, and data descriptive of the URLs (e.g., keywords) in the database 140. Actions relating to the crawler program and the database are further described below with reference to FIGS. 3 and 4.

Exemplary HTML Page

Figure 2A:
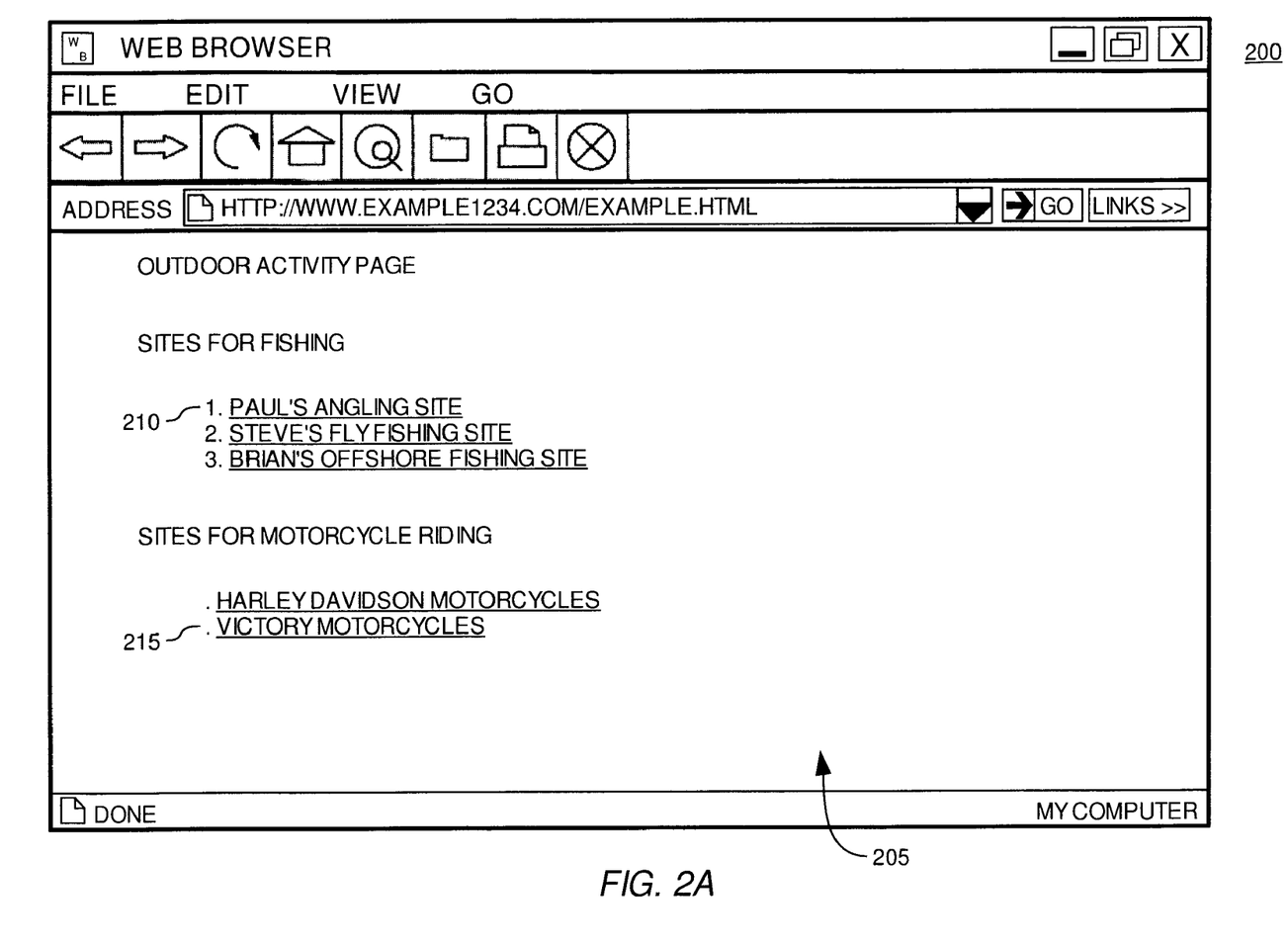
FIG. 2A is an exemplary Hypertext Markup Language (HTML) page containing lists of hyperlinks to HTML pages, according to one embodiment of the invention.

FIG. 2A is an exemplary Hypertext Markup Language (HTML) page 205 displayed in a web browser 200, according to one embodiment of the invention. The HTML page contains lists (210 and 215) of hyperlinks to other HTML pages. FIG. 2A is an example of a HTML page the crawler program 135 may encounter on the network 155.

As illustrated, HTML page 205 contains two lists of hyperlinks to other HTML pages. The first list 210, a numbered list, contains three numbered hyperlinks to other HTML pages. The second list 215, a bulleted list, contains two bulleted hyperlinks to other HTML pages.

Figure 2B:
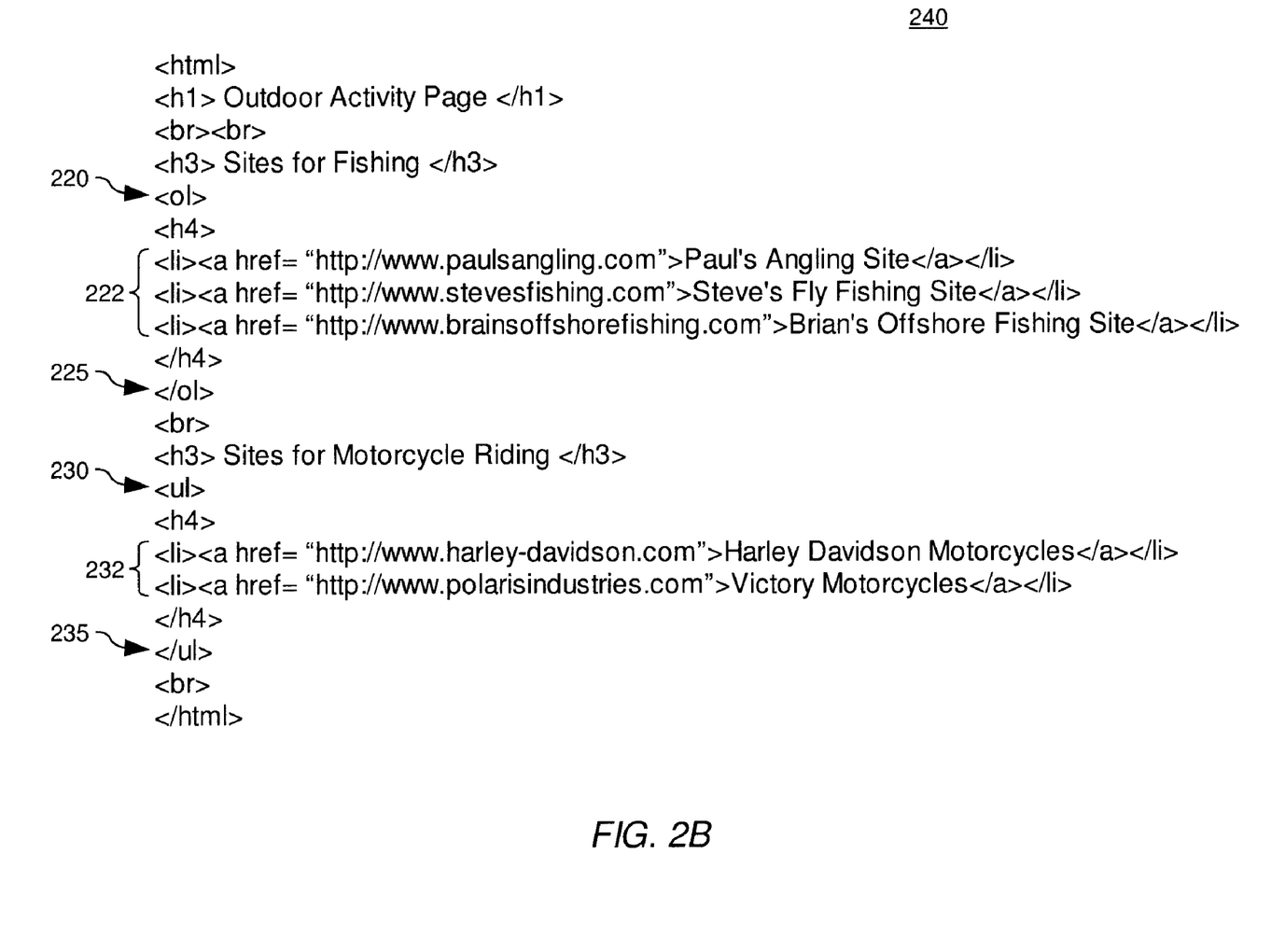
FIG. 2B is exemplary HTML code containing lists of hyperlinks to HTML pages, according to one embodiment of the invention.

FIG. 2B is exemplary HTML code 240 used to generate the exemplary HTML page 205 in FIG. 2A. FIG. 2B illustrates the HTML code used to indicate the beginning of a numbered list 210: "</ol>" 220. Furthermore, FIG. 2B illustrates the coded hyperlinks and associated text 222 which make up the items in the numbered list 210. FIG. 2B also illustrates the HTML code used to indicate the end of a numbered list 210: "</ol>" 225.

FIG. 2B illustrates the HTML code used to indicate the beginning of a bulleted list 215: "<ul>" 230. Furthermore, FIG. 2B illustrates the coded hyperlinks and associated text 232 which make up the items in the bulleted list 215. FIG. 2B also illustrates the HTML code used to indicate the end of a bulleted list 215: </ul> 235.

Exemplary Operations

Figure 3:
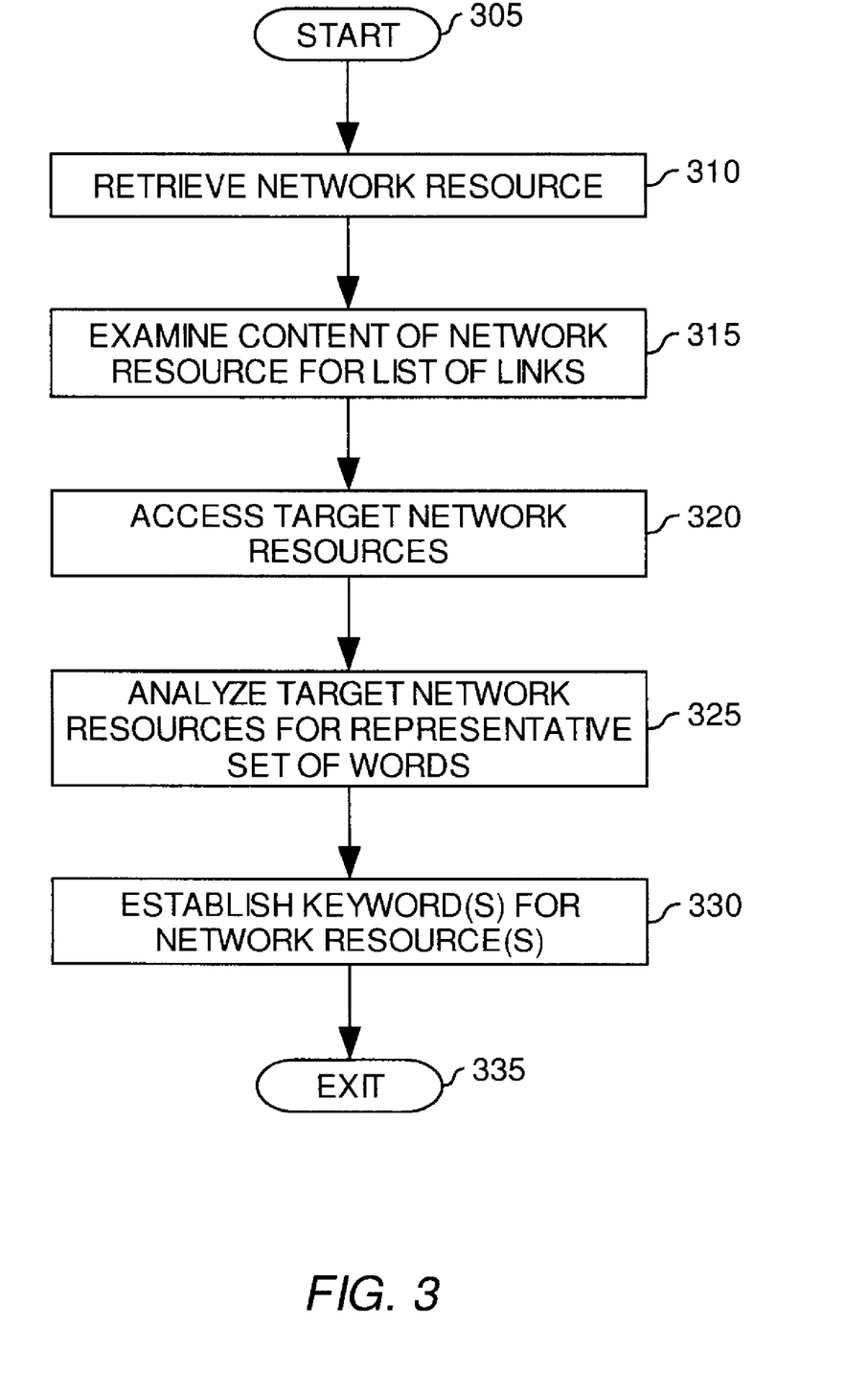
FIGS. 3 and 4 are flowcharts illustrating methods of determining keywords from websites referenced in a list of hyperlinks, according to embodiments of the invention.

FIG. 3 is a flowchart illustrating a method 300 performed by the crawler program 135 to identify common sets of words relating to websites included in lists of links, according to one embodiment of the invention. The method 300 may begin at step 305 when the crawler program 135 is initiated. Next, at step 310, the crawler program 135 may retrieve a network resource for a given network address (e.g., a URL for a website). For example, the crawler program 135 may retrieve the HTML page 205 illustrated in FIG. 2. At step 315, the program 135 may then examine the content of the network resource to identify one or more lists of hyperlinks. The given network address/resource may be referred to as a source network address/resource, while the network addresses/resources pointed to by the respective hyperlinks may be referred to as target addresses/resources. In one embodiment, the target network resources are electronic documents. At step 320, the program 135 accesses some number (e.g., two or more) of the respective target network resources (e.g., documents) pointed to by the at least two respective hyperlinks. Then, at step 325, the program 135 analyzes the respective target resource definitions of the respective target resources to determine a set of words representative of the respective target resource definitions. At step 330, the program 135 performs a keyword determination process to establish (if possible) keywords for at least one of the source network resource and one or more of respective target resources. In one embodiment, step 330 includes comparing each determined set of words to determine whether a commonality exists between the set of words (determined at step 325) based on some predefined criteria. If the commonality exists, the program 135 makes at least a portion of the set of words keywords. Next at step 335 the method 300 exits.

Figure 4:
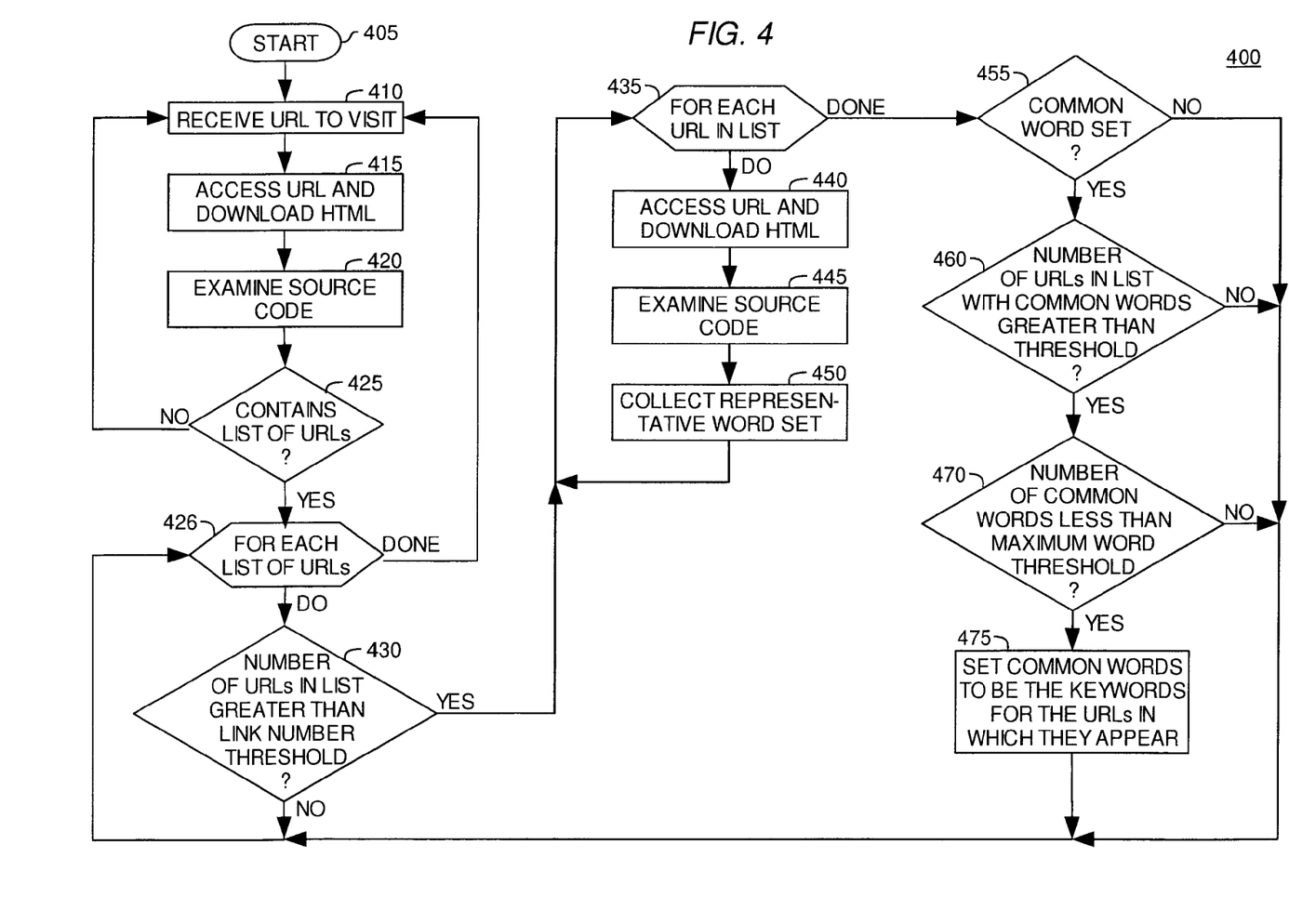

FIG. 4 is a flowchart illustrating a method 400 performed by the crawler program 135 to identify common sets of words relating to websites included in lists of links, according to one embodiment of the invention. More particularly, method 400 may be one embodiment of performing method 300. Method 400 begins at step 405 when the crawler program 135 is initiated. Next, at step 410, the crawler program 135 may receive a URL to visit. The crawler program 135 may then access the URL at step 415, which may include downloading the HTML associated with the URL from a URL server 160. For example, the crawler program may download the example HTML illustrated in FIG. 2B and used to generate the example HTML page 205 in FIG. 2A.

Next, at step 420, the crawler program 135 may examine the downloaded HTML for lists of hyperlinks. The crawler program 135 may be configured to look for particular HTML code followed by several links to determine if there is a list of links. For example, the crawler program 135 may look for the HTML code which indicates a numbered list, "<ol>", plus a series of links. Furthermore, the crawler program may be configured to look for bulleted lists, in which case the crawler program would search the web page HTML source code for the HTML code "<ul>", plus a series of links. A list of hyperlinks may also be created in the form of a table, or any other HTML formatting scheme. The crawler program may be configured to find any such common formatting scheme used to generate and display a list of hyperlinks. Following with the example HTML page 205 in FIG. 2A, at step 420 the crawler program 135 may find the codes "<ol>" and "<ul>" in the HTML code 240 used to generate the example HTML page 205.

Once the crawler program has examined the downloaded URL source code for lists of hyperlinks, the crawler program may determine if lists of hyperlinks were present in the downloaded HTML code. If no lists were present, the crawler program may return to step 410 to retrieve another URL to visit. If a list of hyperlinks was present in the downloaded URL, the crawler program 135 may continue to step 428 where a loop is entered for each identified list.

At step 430, the crawler program may determine if the number of links within a particular link list is greater than a predefined link number threshold. The link number threshold may be used to filter out lists with an insufficient number of hyperlinks. Lists with too few hyperlinks may not contain a content representative common set of words and thus they need not be searched for such. If the number of links in the list is less than or equal to the link number threshold then the crawler program 135 may return to step 428 to examine the next list of links. However, if the number of URLs within the list is greater than the link number threshold then the crawler program 135 may proceed to step 435.

For example, the predefined link number threshold may be two. That is, if there are not more than two hyperlinks (i.e., at least three) within a list then the crawler program 135 may either process other link lists in the downloaded HTML code or return to step 428. Continuing with the example from FIG. 2A, the crawler program 135 may determine that the numbered list 210 has a greater number of links than the link number threshold of two. Therefore, the crawler program 135 may continue to analyze the links within the numbered list 210. However, regarding the bulleted list 215, the crawler program 135 may determine that the bulleted list 215 only has two links, which is equal to the link number threshold of two. Therefore, the crawler program 135 may disregard the links within the bulleted list 215.

Next, at step 435, the crawler program 135 may commence a loop to perform operations in relation to each URL contained in the list of hyperlinks. At step 440, the crawler program 135 may access one URL contained in the list of hyperlinks and download the HTML for that particular URL. For example, for the numbered list 210 in the displayed page 205 of FIG. 2A, the crawler program would access the first URL for the selected list of the three enumerated links. In this example, the crawler program is configured to identify the respective URLs according to the "href" attributes, the respective values of which define the URLs. For example, the first link, "Paul's Angling Site", points to the URL "www.paulsangling.com". In the example HTML page 205, the crawler program may download the HTML from each of the three sites in the numbered list 210, and each of the two sites in the bulleted list 215.

At step 445, the crawler program 135 may examine the content of the downloaded HTML and determine a representative word set for the URL. In one embodiment of the invention, the representative word set for the URL may consist of words which occur within the text of the network resource located at a URL above a predefined frequency.

Determining a representative word set may also be accomplished by ascertaining where a word is located within the network resource located at the URL. Words located in headers or titles may be more indicative of the subject or topic of a given network resource and therefore may be part of the representative word set. Therefore, in one embodiment, a single instance of a word in a "key location" may be sufficient to designate it a representative word for that page. In another embodiment, a weighting system may be implemented such that words located in designed key locations (e.g., titles) are given more weight as a representative word than words in a paragraph. If a word has a sufficient cumulative score (determined by adding all the individual weighted scores) then it is designate as a representative word for that page.

For example, as can be seen in FIG. 2A, all three of the sites in the numbered list 210 deal with the sport of fishing. The crawler program 135 may find that each of these sites have representative words that deal with fishing. For example, a representative word set of one of the sites may consist of: fishing, boat, marina, bait, catch, water, lake, river, ocean, and hook.

In one embodiment, the representative word set may exclude common words that are not indicative of the content of the network resource located at the URL (e.g., a, an, the, yes, no, some, none, etc.). After the crawler program 135 has determined a representative word set for the URL, the crawler program may return to step 435 where the same steps of loop 435 may be carried out for the next URL in the given list. Once loop 435 has been executed for each URL within the list, the crawler program 135 may proceed to step 455.

Next, at step 455, the crawler program 135 may determine if the representative word sets for each URL share a common set of words. Specifically, the representative word sets determined at step 450 for each of the respective URLs in a given list are compared to each other. By "common" it is meant that a given word appears in the representative word lists (generated at step 450) of each of the network resources of the list.

A "common" word may be determined by the crawler program 135 through the use of an algorithm. The algorithm may take a plurality of factors into consideration when determining when a word from the representative word sets from each URL is a common word representative of all the URLs. For example, according to one embodiment of the invention, the algorithm may determine a word is a common word when only the exact word (e.g., letter for letter) appears as a representative word for each of the sites within the link list. According to another embodiment of the invention, the algorithm may determine a representative word is a common word if different forms of the word appear in the representative word lists of the other sites within the link list. For example, a word may appear in noun form in the representative word list of one site and in a conjugated verb form in the representative word list of another site. According to this embodiment of the invention, the word may still be considered a common word. For example, "fish" may be on the representative word list of one URL, while "fishing" may be on the representative word list of another URL. In this example, the crawler program may include the word "fish" in the common word set, the word "fishing" may be included in the common word set, or both words may be included in the common word set.

For example, in regards to the example HTML page 205, the list of links to fishing sites in the numbered list 210 may share the common word set of: fish, bait, catch, fishing, water, lake and river. During a subsequent iteration of the loop entered at step 428, the crawler program will examine the HTML for the web sites in the bulleted list 215. As can also be seen in FIG. 2A, both of the sites in the bulleted list 215 deal with motorcycle riding. The crawler program 135 may find that these sites also share a common set of words (e.g., motorcycle, riding, helmet, or engine).

If the crawler program determines that there is a common word set, the crawler program 135 may continue on to step 460. If there is not a common word set, the crawler program 135 may return to step 428 to process another list of links.

If a common set of words is found in step 455, the crawler program 135 may determine at step 460 if the number of URLs in the list that share a common word set is greater than a threshold number of links with common words. This threshold may be utilized to prevent associating a website with keywords that are not indicative of the content of that website.

For example, if only two of the three URLs in the numbered list 210 in FIG. 2 shared a common word set, then it is not logical to increase the association of the common words with the respective URLs because such a common set of words from such a small number of sites may not correctly indicate the content of the two URLs which share a common set of words. However, if all three sites within the numbered list 210 contain a common set of words, then the common set of words may be indicative of the content of each of the sites in the numbered list 210.

If the number of URLs that share a common word set is not greater than a predefined number of links with common words threshold, the crawler program 135 may return to step 428 to process another list of links. However, if the number of URLs that share a common word set is greater than a predefined number of links with common words threshold, the crawler program 135 may proceed to step 470.

Next, at step 470, the crawler program 135 may determine if the number of words in the common word set is less than a predefined maximum number of common words threshold. If there are more words in the common word set than the maximum value, then this may be an indication that the common word set may not be representative of the content of the HTML pages, and the crawler program 135 may ignore the common word set and return to step 428 to process another list of links. If there are more words in the common word set than the maximum value, this may be an indication that the common word set is over inclusive and not a true representation of the content of the HTML pages. However, if the number of words in the common word set is less than the maximum value, the crawler program 135 may proceed to step 475. At step 475, the common words may be stored in the database 140 as the keywords of the URLs in which they appear.

In further embodiment of the invention, the crawler program 135 may determine that the URLs within the list of links are already stored in the search engine database 140. Furthermore, the search engine database 140 may already contain the same or other keywords associated with the URLs as are in the common word set. The crawler program 135 may update the degree of association of the keywords with the URLs by applying/adjusting a weighting factor for the keywords from the common set of words. This weighting factor may increase the relevance between the keyword(s) from the common set of words and the respective URL in comparison to the relevance between existing keywords not included with the common set of words and the URL. The crawler program 135 may also decrease a weighting factor for keywords that were present in the search engine database 140 but not present in the common set of words.

Following with the example from FIG. 2A, the respective resources in the list of links to fishing sites in the numbered list 210 may have seven words in a common word set. These words may consist of: fish, bait, catch, fishing, water, lake and river. If the predefined maximum value is eight, and because seven is less than eight, at step 475 these seven words would become the keywords associated with and stored in the database 140 with each of the three URLs in the numbered list 210. On the other hand, the respective resources in the list of links may each have more than nine words in their respective representative word lists (created at step 450 of the method 400). In this case, because the number of words in the common word list exceeds the maximum value (8), the method 400 returns to step 410 without associating any keywords to the respective URLs.

Once all of the lists of links have been processed, the crawler program may exit the loop 428 and return to step 410 to receive a new URL to visit.

Consequently, the keywords associated with the URLs and stored in the database 140 may now be used by the search engine server 105 when executing user queries. The program 135 then returns to the loop entered at step 428 to repeat the process for the next list in the source document (e.g., the bulleted list). In this way, keywords are identified for each of the lists in the source document

CONCLUSION

In conclusion the systems and/or methods described herein provide for an effective way to determine the primary content of a website and therefore improve search engine results. By analyzing URL content for lists of hyperlinks to URLs a search engine system or method may analyze the code downloaded from the URLs in those links. The search engine may determine from the downloaded content that each URL in the list of hyperlinks shares a common set of words. This common set of words may become the keywords for the URLs within the list of links.

While the foregoing is directed to embodiments of the present invention, other and further embodiments of the invention may be devised without departing from the basic scope thereof, and the scope thereof is determined by the claims that follow.

What is claimed is:

1. A method for determining keywords representative of the content of an electronic document located at a source network address, comprising:
    analyzing a document definition of the electronic document located at the source network address to identify one or more lists of hyperlinks to other electronic documents located at respective target network addresses; wherein analyzing the document definition to identify one or more lists of hyperlinks comprises scanning the document definition for predefined markup language tags that define the beginning of a list of hyperlinks;
    in response to identifying one or more lists of hyperlinks of the analyzed document:
        for at least two hyperlinks in at least one identified list of hyperlinks, accessing the respective electronic documents pointed to by the at least two respective hyperlinks;
        for each respective electronic document accessed, analyzing the respective document definition of the respective electronic document to determine a set of words which occur above a predefined frequency in the respective electronic document wherein the determined set of words is representative of the respective electronic document;
        comparing each determined set of words to determine whether a commonality exists between the set of words based on some predefined criteria; and
        when the commonality exists, making at least a portion of the set of words keywords for the one or more of respective electronic documents defined by the respective document definitions; wherein making at least the portion of the set of words keywords is conditioned on:
            comparing the number of hyperlinks in the at least one identified list to a predefined threshold number; and
            determining that the number of the hyperlinks in the at least one identified list is greater than the predefined threshold number.

2. The method of claim 1, wherein the source network address is a website.

3. The method of claim 1, wherein making at least the portion of the set of words keywords comprises making the portion of the set of words keywords for each of the respective electronic documents defined by the respective document definitions.

4. The method of claim 1, wherein determining whether a commonality exists between the set of words comprises determining whether there is a common word set between the set of words; and wherein making at least the portion of the set of words keywords comprises making the words in the common word set keywords, the keywords being defined as words accessed by search engines to determine a relevancy of the respective electronic document for a given keyword search.

5. The method of claim 4, wherein making the words in the common word set keywords comprises making the words in the common word set keywords for each of the respective electronic documents defined by the respective document definitions.

6. The method of claim 4, wherein making the words in the common word set keywords is conditioned on first establishing that the number of the words in the common word set is less than a predefined threshold number.

7. A method for determining keywords, comprising:
    analyzing a document definition of an electronic document located at a website to identify one or more lists of hyperlinks to other electronic documents;
    accessing respective document definitions for each electronic document pointed to by the respective hyperlinks in the identified one or more lists;
    for each of the respective document definitions, analyzing the respective document definition to determine a set of words which occur above a predefined frequency in the respective electronic document wherein the determined set of words is representative of the respective document definition; wherein analyzing the document definition to identify one or more lists of hyperlinks comprises scanning the document definition for predefined markup language tags that define the beginning of a list of hyperlinks;
    in response to identifying one or more lists of hyperlinks of the analyzed document:
        comparing each determined set of words to one another to determine whether there is a common set of words; and
        when there is a common set of words, making the common set of words the keywords for each site containing the common set of words, the keywords being defined as words accessed by search engines to determine a relevancy of the respective site for a given keyword search; wherein making the common set of words keywords is conditioned on:
            comparing the number of the hyperlinks in the at least one identified list to a predefined threshold number; and
            determining that the number of the hyperlinks in the at least one identified list is greater than the predefined threshold number.

8. The method of claim 7, wherein making the common set of words the keywords is conditioned on first establishing that the number of the words in the common set of words is less than a predefined threshold number.

9. A computer readable storage medium containing a program which, when executed, performs an operation for determining keywords representative of the content of an electronic document located at a source network address, the operation comprising:

analyzing a document definition of the electronic document located at the source network address to identify one or more lists of hyperlinks to other electronic documents located at respective target network addresses; wherein analyzing the document definition to identify one or more lists of hyperlinks comprises scanning the document definition for predefined markup language tags that define the beginning of a list of hyperlinks;

in response to identifying one or more lists of hyperlinks of the analyzed document:

for at least two hyperlinks in at least one identified list of hyperlinks, accessing the respective electronic documents pointed to by the at least two respective hyperlinks;

for each respective electronic document accessed, analyzing the respective document definition of the respective electronic document to determine a set of words which occur above a predefined frequency in the respective electronic document wherein the determined set of words is representative of the respective electronic document;

comparing each determined set of words to an determine whether a commonality exists between the set of words based on some predefined criteria; and         when the commonality exists, making at least a portion of the set of words keywords for the one or more of respective electronic documents defined by the respective document definitions; wherein making at least the portion of the set of words keywords is conditioned on:

comparing the number of hyperlinks in the at least one identified list to a predefined threshold number; and             determining that the number of the hyperlinks in the at least one identified list is greater than the predefined threshold number.

10. The computer readable storage medium of claim 9, wherein the source network address is a website.

11. The computer readable storage medium of claim 9, wherein making at least a portion of the set of words keywords is conditioned on first establishing that the number of the hyperlinks in the at least one identified list is greater than a predefined threshold number.

12. The computer readable storage medium of claim 9, wherein making at least the portion of the set of words keywords comprises making the portion of the set of words keywords for each of the respective electronic documents defined by the respective document definitions.

13. The computer readable storage medium of claim 9, wherein determining whether a commonality exists between the set of words comprises determining whether there is a common word set between the set of words; and wherein making at least the portion of the set of words keywords comprises making the words in the common word set keywords, the keywords being defined as words accessed by search engines to determine a relevancy of the respective electronic document for a given keyword search.

14. The computer readable storage medium of claim 13, wherein making the words in the common word set keywords comprises making the words in the common word set keywords for each of the respective electronic documents defined by the respective document definitions.

15. The computer readable storage medium of claim 13, wherein making the words in the common word set keywords is conditioned on first establishing that the number of the words in the common word set is less than a predefined threshold number.

16. A computer system, comprising:

a processor configured to:

analyze a document definition of an electronic document located at a source network address to identify one or more lists of hyperlinks to other electronic documents located at respective target network addresses; wherein analyzing the document definition to identify one or more lists of hyperlinks comprises scanning the document definition for predefined markup language tags that define the beginning of a list of hyperlinks;

in response to identifying one or more lists of hyperlinks of the analyzed document;

for at least two hyperlinks in at least one identified list of hyperlinks, access the respective electronic documents pointed to by the at least two respective hyperlinks;

for each respective electronic document accessed, analyze the respective document definition of the respective electronic document to determine a set of words which occur above a predefined frequency in the respective electronic document wherein the determined set of words is representative of the respective electronic document;

compare each determined set of words to an determine whether a commonality exists between the set of words based on some predefined criteria; and         when the commonality exists, making at least a portion of the set of words keywords for one or more of respective electronic documents defined by the respective document definitions; wherein making at least the portion of the set of words keywords is conditioned on:

comparing the number of hyperlinks in the at least one identified list to a predefined threshold number; and             determining that the number of the hyperlinks in the at least one identified list is greater than the predefined threshold number.

17. The computer system of claim 16, wherein the source network address is a website.

18. The computer system of claim 16, wherein making at least the portion of the set of words keywords comprises making the portion of the set of words keywords for each of the respective electronic documents defined by the respective document definitions.

19. The computer system of claim 16, wherein determining whether a commonality exists between the set of words comprises determining whether there is a common word set between the set of words; and wherein making at least the portion of the set of words keywords comprises making the words in the common word set keywords, the keywords being defined as words accessed by search engines to determine a relevancy of the respective electronic document for a given keyword search.

20. The computer system of claim 19, wherein making the words in the common word set keywords comprises making the words in the common word set keywords for each of the respective electronic documents defined by the respective document definitions.

21. The computer system of claim 19, wherein making the words in the common word set keywords is conditioned on first establishing that the number of the words in the common word set is less than a predefined threshold number.

\* \* \* \* \*